(12) United States Patent
Batchelder et al.

(10) Patent No.: US 6,980,680 B2
(45) Date of Patent: Dec. 27, 2005

(54) SCANNING SYSTEM FOR IDENTIFYING AND LABELING X-RAYS

(75) Inventors: Lee Batchelder, Derry, NH (US); William Langille, Amherst, NH (US)

(73) Assignee: Howtek Devices Corporation, Nashua, NH (US)

(*) Notice: Subject to any disclaimer, the term of this patent is extended or adjusted under 35 U.S.C. 154(b) by 205 days.

(21) Appl. No.: 10/373,999

(22) Filed: Feb. 25, 2003

(65) Prior Publication Data

US 2004/0165700 A1  Aug. 26, 2004

(51) Int. Cl.[7] ............................................. G06K 9/00
(52) U.S. Cl. ................................................ 382/128
(58) Field of Search ............................. 382/128, 132; 250/559.02, 559.05, 559.06; 378/176

(56) References Cited

U.S. PATENT DOCUMENTS

| | | | |
|---|---|---|---|
| 5,384,643 A * | 1/1995 | Inga et al. ................... | 358/403 |
| 6,181,809 B1 | 1/2001 | Primo et al. ................. | 382/128 |
| 6,198,837 B1 * | 3/2001 | Sasano et al. .............. | 382/132 |
| 6,271,940 B1 | 8/2001 | Deschuytere et al. ....... | 358/504 |
| 6,404,516 B1 | 6/2002 | Edgar .......................... | 358/487 |
| 6,556,698 B1 | 4/2003 | Diano et al. ................ | 382/132 |

FOREIGN PATENT DOCUMENTS

| | | | |
|---|---|---|---|
| DE | 952 726 | 11/1956 | |
| EP | 952 726 A1 | 10/1999 | ............ H04N 1/21 |

* cited by examiner

*Primary Examiner*—Andrew W. Johns
*Assistant Examiner*—Shervin Nakhjavan
(74) *Attorney, Agent, or Firm*—Grossman, Tucker, Perreault & Pfleger, PLLC

(57) ABSTRACT

A scanning system for scanning and identifying an X-ray film in a medical application includes a scanner configured to accept the X-ray film and provide an image digital signal representative of an image stored on the X-ray film, wherein the X-ray film includes an image portion and a text portion, and a computer configured to accept the image digital signal and convert text characters of the text portion into a text digital signal representative of the text characters. Optical character recognition software may be utilized to recognize and convert the text characters of an image signal into the digital signal. The scanning system may create a reflective label such as a bar code label or a text label that may be affixed to an associated X-ray film to aid in identification of such X-ray.

9 Claims, 2 Drawing Sheets

SCANNING SYSTEM FOR IDENTIFYING AND LABELING X-RAYS

FIELD OF THE INVENTION

The present invention relates generally to scanning systems, and in particular to a scanning system for identifying and labeling X-ray films using optical character recognition (OCR) software.

BACKGROUND OF THE INVENTION

The extensive use and importance of X-ray films in the medical field requires that each X-ray film be carefully and accurately marked with proper identifying information. Typically, such identifying information is related to the patient, institution, and X-ray particulars. To incorporate such information into an X-ray image, it is typically entered into an identification (ID) system apparatus. An X-ray film cassette is then also placed in such an ID system apparatus. Finally, the ID system apparatus then photographically exposes or "flashes" the information onto the film cassette such that the information is recorded as transparent data on the X-ray film and is viewable by holding such portion up to an illumination source. Therefore, such information is typically referred to as the "flasher" portion or the text portion of the X-ray film. The film cassette is later used to store an X-ray image from an associated patient. As such, the X-ray film includes both the image portion from the particular patient and the text portion.

Scanners that convert images on an X-ray film into an image signal representative of the image are known in the art. Such a scanner may also be operated in conjunction with a computer. The computer may also include various software diagnostic applications to assist a physician in analyzing and diagnosing matters detailed on such X-ray films. Most such software applications are typically designed to aid, not to displace, a physician's traditional analysis of the X-ray film using a typical X-ray viewer. A typical X-ray viewer known in the art has a bright, diffuse illumination source and a surface portion upon which an X-ray film may be placed.

For instance, such a software diagnostic application may be a mammography application that analyzes X-rays of the breast. The mammography application typically identifies areas of the breast X-ray that should be examined further to aid in the early detection of breast cancer. As such, a physician typically examines both the image file of the associated breast X-ray(s) with the aid of such a mammography software application in conjunction with an associated breast X-ray(s) film of the particular patient.

In performing such diagnostic procedures, a physician typically first places the X-ray film on an X-ray viewer and then searches electronic archives to access the associated image file of the scanned X-ray film. To obtain proper information for such electronic searching, the physician typically views the identifying information on the flasher portion of the X-ray film. The flasher portion must be held up to an illumination source such as that found in a traditional X-ray viewer in order to accurately read such information. Otherwise, the flasher information is difficult to read which could result in identifying errors.

In addition, any translation of such identifying data on the flasher into electronic form to aid in identifying of such X-rays with an associated image file must be accomplished by data entry. Such data entry is time consuming and creates further opportunities for data entry mistakes. As such, existing systems and procedures increase the chances for identifying errors to be made by accessing an image file of a scanned version of an X-ray film that does not match the particular X-ray film being viewed by the physician.

Accordingly, there is a need in the art for a scanning system that automatically converts any text on an X-ray film into an associated text digital signal. Such a text digital signal may be output as a text label or a bar code label to aid in identification of X-ray films.

BRIEF SUMMARY OF THE INVENTION

A scanning system for scanning and identifying an X-ray film in a medical application consistent with the invention includes: a scanner configured to accept the X-ray film and provide an image digital signal representative of an image stored on the X-ray film, wherein the X-ray film includes an image portion and a text portion; and a computer configured to accept the image digital signal. The computer includes a machine readable medium whose contents cause the computer to perform a method of recognizing text characters from the text portion of the X-ray film, and converting the text characters into a text digital signal representative of the text characters.

According to another aspect of the invention, there is provided a method of automatically creating a reflective label for identifying an X-ray film. The method includes the steps of: producing a digital image signal representative of an image on the X-ray film; recognizing text characters from the digital image signal; converting the text characters into a text digital signal representative of the text characters; and outputting the reflective label, wherein the reflective label is representative of the text characters.

According to a further aspect of the invention, there is provided a scanning system for scanning and identifying an X-ray film in a medical application that includes: a scanner configured to accept the X-ray film and provide an image digital signal representative of an image stored on the X-ray film, wherein the X-ray film includes an image portion and a text portion; and a computer configured to accept the image digital signal and convert text characters of the text portion into a text digital signal representative of the text characters.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1:
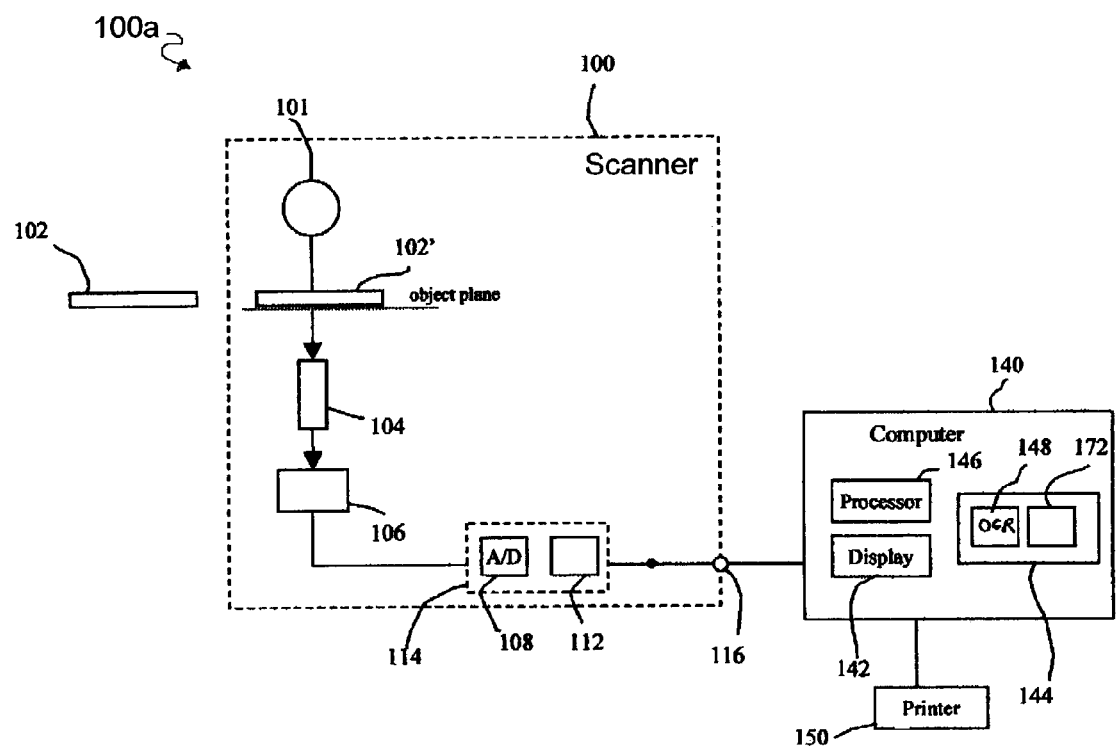
FIG. 1 is a simplified block diagram of a scanning system consistent with the invention including a scanner and computer.

FIG. 1 illustrates a simplified block diagram of a scanning system 100a consistent with the invention including a scanner 100 and computer 140. The scanner 100 generally includes an illuminator 101, a lens 104, a light sensitive element 106, and electrical processing circuitry 114 including an analog to digital converter 108 and a processor 112. In general, the scanner 100 converts optical densities of an image on a data medium 102 to a digital image signal that represents various intensities of transmitted light and thus densities of the data on the applicable medium.

Once the transparent data medium 102 is properly positioned 102', light from the illuminator 101 passes through the transparent data medium 102. In one embodiment the transparent data medium 102 is an X-ray film. The amount of light passing through the data medium depends on the transmittance or optical density of the particular image on the data medium 102 at each pixel. A lens 104 may also be used to image the light onto the light sensitive element 106.

The light sensitive element 106 accumulates photons and converts such photons into an analog electrical signal representative of the accumulated photons. The light sensitive element 106 may by a variety of elements known in the art such as a charge coupled device (CCD) array or a CMOS array. The light sensitive element 106 may be in the form of a line, square, rectangle, or any various shape such that the whole data medium 102 may be virtually divided into areas and every area corresponds to an analog signal that represents the amount of light transmitted through that area. In this manner, an analog image signal may be obtained which represents the whole image recorded on the transparent data medium 102.

The analog image is then processed by electronic processing circuitry 114. The electronic processing circuitry 114 may include a variety of devices known in the art including the analog to digital converter 108 for converting the image analog signal into an image digital signal and a processor 112. As such, an image digital signal may be output to terminal 116 for further electronic use, e.g., electronic storage, processing, and communication.

A computer 140 having a variety of components may also be coupled to the output terminal 116. The computer 140 may also be integrated with the digitizer 100 such that the digitizer system 100a is one integrated unit. The computer 140 includes machine-readable media 144, a processor 146, and various output devices such as a video display screen 142 coupled to each other in a known manner. A printer 150 may also be coupled to, or integrated with, the computer 140. Advantageously, the computer 140 also includes an optical character recognition (OCR) software application 148 that may be stored on the machine readable medium 144. The OCR application 148 includes software routines for execution by the processor 146.

The processor 146 can be any type of processor capable of providing the speed and functionality required by embodiments of the invention. For example, the processor could be a processor from the Pentium® family of processors made by Intel Corporation.

The machine-readable media 144 can be any type of media capable of storing instructions adapted to be executed by the processor 146. Some examples of such media include, but are not limited to, system RAM, read only memory (ROM), programmable ROM, magnetic disk (e.g., floppy disk and hard disk drive), optical disk (e.g., CD/DVD ROM), and any other device that can store digital information. As used herein, the phrase "adapted to be executed by a processor" is meant to encompass instructions stored in compressed and/or encrypted format, as well as instructions that have to be compiled or installed by an installer before being executed by the processor. The processor 146 and machine-readable medium 144 may be part of the computer 140 as illustrated in FIG. 1 or may be part of the scanner 100. Various combinations of machine-readable media may also store combinations of the OCR software 148 which are accessible to the processor 146 through various controllers.

Figure 2:
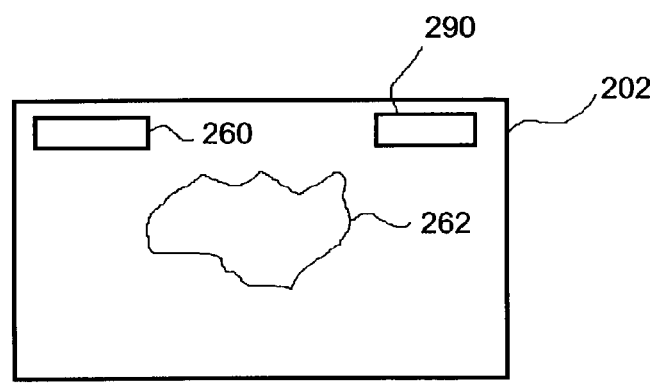
FIG. 2 is an exemplary X-ray film for use with the scanning system of FIG. 1.

Turning to FIG. 2, an exemplary X-ray film 202 that may be scanned and processed by the scanning system 100a of FIG. 1 is illustrated. The X-ray film 202 generally includes a text portion 260, an image portion 262, and a reflective label 290 as further detailed herein. The text portion 260 contains identifying information in text characters that generally relate to the patient, institution, and various X-ray particulars. For example, identifying information for the patient may be stored in field names including the patient's name, date of birth, social security number, etc. Identifying information for the institution may be stored in field names including the institution's name and address. Finally, identifying information for the X-ray particulars may be stored in field names including exposure time, exposure date, exposure time of day, generator beam current, generator X-ray production time, radiation dose, irradiated tissue thickness, compression force, generator operational mode, view, X-ray beam filter material, calibration status, image distance, magnification, technologist identification, etc. The image portion 262 of the X-ray film 202 is an X-ray image of a body part of a particular patient as identified in the text portion 260.

Once the X-ray 202 is scanned, a digital image signal representative of the image data recorded on the X-ray is output to the computer 140 of the system 100a via terminal 116. The computer may store such digital image signal in an image file in any variety of image formats. Some exemplary image file formats include bitmap (BMP), encapsulated post script (EPS), digital imaging and communications in medicine (DICOM), and tagged-image file format (TIF) to name only several.

The OCR application 148 includes OCR software routines known in the art for execution by the processor 146. In general, the OCR application 148 converts any text characters from the image digital signal, as representative of the text portion 260 of the X-ray film 202, into a text digital signal. Such a text digital signal is then recognizable by any variety of word processing software applications.

To accomplish such a conversion, the OCR application searches the digital image signal for any text that may be included in the text portion 260 of the X-ray film 202. If there is any text, the OCR application 148 performs character recognition. Such character recognition generally includes a feature extractor and a character classifier. The feature extractor determines the unique features used to describe any particular character. The derived features are then input to a character classifier which utilizes such data to classify the character. Such character classification can be done a variety of ways known to those skilled in the art including template matching or structural classification methods. Finally, the OCR application 148 may also contain some contextual processing programs to verify or check the results of the character classification.

As such, the OCR application 148 will recognize any text included in the text portion 260 of the X-ray 202 and provide a text digital signal representative of the text characters. This text digital signal may then be utilized, processed, stored, and output in any variety of ways. For instance, the computer 140 may be configured to automatically output the text digital signal in a text format including a reflective label 290 that may be affixed to the associated X-ray film 202. The reflective label 290 may be automatically affixed to the X-ray film in a corner thereof after scanning of such an X-ray film. Alternatively, such a reflective label may be affixed to the X-ray film by a user of the system 100a.

Such a reflective label 290 contains all the pertinent identifying data on the text portion 260 of the X-ray film 202. As such, the reflective label 290 is legible without the need for an illumination source such as that found in an X-ray viewer. In addition, the computer 140 may be configured to increase the font size of the text characters as compared to that on the transparent text portion 260 of the X-ray film 202 to improve readability of such data without interfering with the image portion 262.

In addition, the scanning system 100a may further include a bar code software application 172 that is also stored on the machine-readable medium 144. Once the OCR software application 148 transforms the text data from the text portion 260 into a text digital signal representative of the text characters, the bar code software 172 may utilize that signal to create a bar code signal representative of the text characters. Such a bar code signal may then be utilized by the bar code software application 172 to create a bar code label. Such bar code software application 172 includes software routines for execution by the processor 146 as known in the art to accomplish such tasks.

Figure 3:
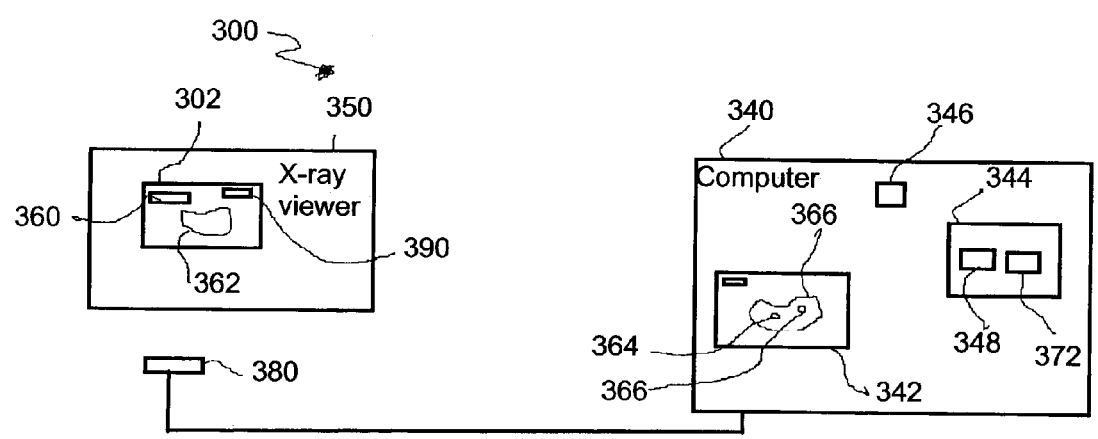
FIG. 3 is a block diagram of an X-ray identification and diagnosis system consistent with the invention.

Turning to FIG. 3, an exemplary diagnosis system 300 that may be utilized by a physician to analyze and diagnose an X-ray film 302 is illustrated. A bar code reflective label 390 previously created as earlier described is affixed to a corner of the X-ray film 302. The typical transparent flasher 360 is also incorporated in another corner of the X-ray film 302. When a physician wishes to examine such an X-ray film 302, it is typically placed on an X-ray viewer 350. In order to reliably and easily access the associated image file of a scanned version of such X-ray film, the physician utilizes a bar code reader 380 to read the bar code label 390 affixed to the X-ray film 302. The computer 340, which may be the computer of the digitizing system 100a of FIG. 1, then automatically accesses the associated image file of the X-ray image utilizing the bar code software application 172 and displays such image on an associated video display 342 via methods as understood by those skilled in the art.

Various software products may then be utilized to assist the physician in analysis and diagnosis. For instance, a mammography diagnostic software application could assist a physician by identifying areas 364, 366 of a breast X-ray image 366 that should be examined further to aid in the early detection of breast cancer. The physician may then further examine such areas 364, 366 in the accompanying X-ray film 302 displayed on the X-ray viewer 350.

Other applications that may benefit from the aforementioned labeling of X-ray films are also contemplated. For instance, an X-ray identification and verification system may be utilized with an identification bracelet typically worn by patients. As a physician examines an X-ray via an X-ray viewer, the bar code label 390 on the X-ray can be read or scanned and cross checked with a bar code on the ID bracelet of the patient to verify that the subject X-ray is indeed that of the particular patient. As such, inadvertently associating a particular X-ray with the wrong patient can be practically eliminated.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A method of creating a reflective label for identifying an X-ray film, said method comprising the steps of:
   producing a digital image signal representative of an image on said X-ray film;
   recognizing text characters from said digital image signal;
   converting said text characters into a text digital signal representative of said text characters; and
   outputting said reflective label, wherein said reflective label is representative of said text characters.

2. The method of claim 1, further comprising the step of affixing said reflective label to an associated X-ray film.

3. The method of claim 1, further comprising the step of converting said text digital signal into a bar code signal representative of said text characters, and wherein said reflective label comprises a bar code label.

4. The method of claim 1, wherein said reflective label comprises text.

5. A scanning system for scanning and identifying an X-ray film in a medical application, said system comprising:
   a scanner configured to accept said X-ray film and provide an image digital signal representative of an image stored on said X-ray film, wherein said X-ray film comprises an image portion and a text portion; and
   a computer configured to accept said image digital signal, said computer comprising a machine readable medium whose contents cause said computer to perform a method comprising the steps of:
   recognizing text characters from said text portion of said X-ray film;
   converting said text characters into a text digital signal representative of said text characters; and
   outputting said text digital signal in a text format wherein said text format comprises a reflective label.

6. A scanning system for scanning and identifying an X-ray film in a medical application, said system comprising:
   a scanner configured to accept said X-ray film and provide an image digital signal representative of an image stored on said X-ray film, wherein said X-ray film comprises an image portion and a text portion; and
   a computer configured to accept said image digital signal, said computer comprising a machine readable medium whose contents cause said computer to perform a method comprising the steps of:
   recognizing text characters from said text portion of said X-ray film;
   converting said text characters into a text digital signal representative of said text characters; and
   converting said text digital signal into a bar code digital signal representative of said text characters on said X-ray film.

7. The scanning system of claim 6, wherein said method further comprises the step of outputting said bar code signal as a bar code label.

8. A scanning system for scanning and identifying an X-ray film in a medical application, said system comprising:
   a scanner configured to accept said X-ray film and provide an image digital signal representative of an image stored on said X-ray film, wherein said X-ray film comprises an image portion and a text portion; and
   a computer configured to accept said image digital signal and convert text characters of said text portion into a text digital signal representative of said text characters and to output said text digital signal in a text format wherein said text format comprises a reflective label to affix to said X-ray film.

9. A scanning system for scanning and identifying an X-ray film in a medical application, said system comprising:
   a scanner configured to accept said X-ray film and provide an image digital signal representative of an image stored on said X-ray film, wherein said X-ray film comprises an image portion and a text portion; and
   a computer configured to accept said image digital signal and convert text characters of said text portion into a text digital signal representative of said text characters, to convert said text digital signal into a bar code digital signal representative of said text characters on said X-ray film, and output said bar code signal as a bar code label to affix to said X-ray film.

* * * * *